United States Patent
Nakashima et al.

(10) Patent No.: US 7,650,201 B2
(45) Date of Patent: *Jan. 19, 2010

(54) DETERMINATION METHOD AND PROCESSING METHOD OF MACHINED SURFACE OF PLATE-LIKE MATERIAL, AND APPARATUS FOR USE IN SAID METHODS

(75) Inventors: Koichi Nakashima, Ibaraki (JP); Nobuyoshi Komachi, Ibaraki (JP)

(73) Assignee: Nippon Mining & Metals Co., Ltd., Tokyo (JP)

( * ) Notice: Subject to any disclaimer, the term of this patent is extended or adjusted under 35 U.S.C. 154(b) by 414 days.

This patent is subject to a terminal disclaimer.

(21) Appl. No.: 11/574,629

(22) PCT Filed: Jun. 27, 2005

(86) PCT No.: PCT/JP2005/011715

§ 371 (c)(1),
(2), (4) Date: Mar. 6, 2007

(87) PCT Pub. No.: WO2006/027885

PCT Pub. Date: Mar. 16, 2006

(65) Prior Publication Data

US 2007/0233312 A1    Oct. 4, 2007

(30) Foreign Application Priority Data

Sep. 3, 2004    (JP) ............................. 2004-256777

(51) Int. Cl.
*G06F 19/00* (2006.01)
(52) U.S. Cl. .................. 700/171; 700/164; 700/195
(58) Field of Classification Search ................ 700/114, 700/164, 171, 195, 279; 702/154; 356/4.08
See application file for complete search history.

(56) References Cited

U.S. PATENT DOCUMENTS

| 6,474,379 B1 * | 11/2002 | Mellor et al. ............... 144/357 |
| 7,277,818 B2 * | 10/2007 | Sakata et al. ................ 702/154 |
| 2009/0055009 A1 | 2/2009 | Nakashima et al. |

FOREIGN PATENT DOCUMENTS

| JP | 63-173607 A | 7/1988 |
| JP | 1-193172 A | 8/1989 |

OTHER PUBLICATIONS

Esp@cenet Database, English Abstract of JP 6-066549, Mar. 8, 1994.
Esp@cenet Database, English Abstract of JP 53-069069, Jun. 20, 1978.

(Continued)

*Primary Examiner*—Ryan A Jarrett
(74) *Attorney, Agent, or Firm*—Howson & Howson LLP (57) ABSTRACT

Provided is a surface treatment method for performing machining such as cutting work, grinding, and electrical discharging to a plate-like material with two- or three-dimensional deformation to realize a uniform thickness. This method includes the steps of mounting the plate-like material on a surface plate, setting a coordinate axis in a plane direction of the plate-like material to be X, Y and setting a coordinate axis in a height direction of the plate-like material to be Z, virtualizing a surface containing an origin of the measured Z direction, measuring a height $Z_{1-n}$ from the origin in an arbitrary plane position, and inclining and cutting the plate-like material so that an absolute value of a difference between a maximum value $Z_{max}$ and a minimum value $Z_{min}$ of the obtained height data will be minimum. Although a ceramic sintered plate such as a sputtering target or a metal plate prepared by metal rolling or forging, in most instances, is subject to two- or three-dimensional deformation as a result of thermal stress or machining stress during the manufacturing process, this invention is able to obtain a flat plate-like material having a uniform thickness and minimal machining costs from a plate-like material with two- or three-dimensional deformation.

20 Claims, 3 Drawing Sheets

OTHER PUBLICATIONS

Esp@cenet Database, English Abstract of JP 7-128022, May 19, 1995.
Esp@cenet Database, English Abstract of JP 11-201748, Jul. 30, 1999.
Esp@cenet Database, English Abstract of JP 5-223550, Aug. 31, 1993.
Koichi Nakashima et al., Co-Pending U.S. Appl. No. 12/281,847 (cited for double patenting issues only).

* cited by examiner

DETERMINATION METHOD AND PROCESSING METHOD OF MACHINED SURFACE OF PLATE-LIKE MATERIAL, AND APPARATUS FOR USE IN SAID METHODS

BACKGROUND OF THE INVENTION

The present invention relates to a determination method and a machining method of a machined surface of a plate-like material in a surface treatment for obtaining a flat plate-like material having a uniform thickness and minimal machining costs from a plate-like material with two- or three-dimensional deformation, as well as to an apparatus to be used in these methods.

A ceramic sintered plate such as a sputtering target or a metal plate prepared by metal rolling or forging, in most instances, is subject to two- or three-dimensional deformation as a result of thermal stress or machining stress during the manufacturing process. In order to obtain a flat plate-like material having a uniform thickness from a plate-like material with such three-dimensional deformation, machining such as cutting work, grinding, and electrical discharging is performed.

Conventionally, a material with this kind of deformation was subject to the foregoing processes by an operator setting such material directly on a processing machine, or the operator would roughly measure the deformation of the individual plate-like materials in advance with a straight edge or the like, and insert a spacer during the stage of setting such materials in the processing machine in order to maintain flatness. Nevertheless, the current status is that the foregoing methods are conducted based on the operator's instincts.

For instance, when grinding a material based on the operator's instincts, even in the operator is an expert, he/she will need to perform such grinding more than necessary in order to obtain a plane. This is because it will not be possible to maintain the accuracy of flatness or uniform thickness if the operator does not perform such excessive grinding. Therefore, it was necessary to set the machining costs of the material itself higher, and this led to deterioration in the yield. In addition, this also led to increased operation time of the processing machine as a matter of course.

As conventional technology, there are an apparatus capable of precisely measuring the thickness of respective warped plate-shaped works (for instance, refer to Patent Document 1), a warped measuring device comprising a measurement reference unit, a measurement unit, a displacement measurement unit for converting into electrical signals, a warp measure display unit, and a control unit (for instance, refer to Patent Document 2), a manufacturing methods of a ceramic product comprising the steps of pressurizing and molding ceramic material powder, irradiating a light beam on the surface thereof, and measuring the surface status upon receiving the reflected light (for instance, refer to Patent Document 3), a size measurement ceramic gauge provided with a stepwise portion (for instance, refer to Patent Document 4), a plate flatness measuring device comprising a downward measuring unit for measuring the flatness, a plate support pin, a vertical motion actuator, and a pressure regulation unit (for instance, refer to Patent Document 5), and a method for measuring the shape irregularity of a ceramic substrate using infrared thermography (for instance, refer to Patent Document 6).

Nevertheless, the foregoing conventional technologies are methods or devices for measuring flatness, measuring displacement or measuring shape irregularities, and do not provide the concept of improving the yield upon performing surface treatment with machining such as cutting work, grinding, and electrical discharging.

[Patent Document 1] Japanese Patent Laid-Open Publication No. H6-66549
[Patent Document 2] Japanese Examined Patent Application Publication No. S59-36202
[Patent Document 3] Japanese Patent Laid-Open Publication No. S63-173607
[Patent Document 4] Japanese Patent Laid-Open Publication No. H7-128002
[Patent Document 5] Japanese Patent No. 3418819
[Patent Document 6] Japanese Patent No. 3183935

SUMMARY OF THE INVENTION

As described above, a ceramic sintered plate such as a sputtering target and a metal plate prepared by metal rolling or forging, in most instances, are subject to two- or three-dimensional deformation as a result of thermal stress or machining stress during the manufacturing process. Thus, an object of the present invention is to obtain a plate-like material having flat and uniform thickness from a plate-like material with two- or three-dimensional deformation and to provide a determination method of a machined surface of a plate-like material in a surface treatment such as cutting work, grinding and electrical discharging to obtain a plate-like material having minimal machining costs and uniform thickness, as well as to an apparatus to be used in these methods.

In order to achieve the foregoing object, as a result of intense study, the present inventors discovered that it is possible to obtain a flat plate-like material having uniform thickness with a favorable yield by measuring the height $Z_{1\ to\ n}$ from a reference plane in an arbitrary plane position, measuring an absolute value of a difference of a maximum value $Z_{max}$ and a minimum value $Z_{min}$ of the obtained height data, and performing surface treatment by adjusting the inclination of the plate-like material on a block so that the machining costs will be minimal.

Based on the foregoing discovery, the present invention provides:

1) A method of determining a machined surface of a plate-like material capable of minimizing machining costs upon machining the plate-like material with two- or three-dimensional deformation to realize a uniform thickness, comprising the steps of mounting the plate-like material on a surface plate, setting a coordinate axis in a plane direction of the plate-like material to be X, Y and setting a coordinate axis in a vertical direction of the plate-like material to be Z, virtually configuring with a computer a plane ABCD in which a distance in the vertical direction from the surface plate is H, measuring a prescribed coordinate number while changing a distance (height) $Z_{00}$ from the plane ABCD in the coordinates (X, Y) of the plane ABCD to the coordinates (X, Y) of an upper surface of the plate-like material as an object to be measured while changing (X, Y), searching for a maximum value $Z_{00}$ (max) and a minimum value $Z_{00}$ (min) from all coordinate points to calculate a difference $D_{00}$ thereof, subsequently fixing end A and end B or end A and end C of the plane ABCD, inclining the plane ABCD against the surface plate by sequentially raising and lowering either end C or end B in a prescribed height at a time within a prescribed range in the Z axis direction, measuring the height from the plane ABCD to the upper surface of the plate-like material regarding all coordinate points (X, Y) on the plane ABCD as with the initial measurement when representing a new height Zmn by measuring a corresponding coordinate point of a material from the respective coordinates of the plane ABCD each time the inclination is changed one unit, repeating the search for the maximum value Zmn (max) and the minimum value Zmn (min) to calculate the difference $D_{mn}$ regarding all inclination conditions, and deciding the smallest value of the obtained height difference $D_{00-mn}$ as a parallel plane of a plane in which the plane ABCD (Dmin) will be of a minimum machining cost;

2) The method of determining a machined surface [of a plate-like material] according to paragraph 1) above, wherein, upon reversing and mounting the plate-like material on the surface plate of the processing machine, a measurement point in which a height Z from the plane ABCD to the plate-like material is a smallest value in the determined minimum machined plane ABCD is searched, and the measurement point is set as a point that comes in contact with the surface plate;

3) The method of determining a machined surface [of a plate-like material] according to paragraph 1) or paragraph 2) above, wherein, upon reversing and mounting the plate-like material on the surface plate of the processing machine, the smallest value Zmin of the height Z from the plane ABCD to the plate-like material is subtracted from a height of the measurement point of four corners of the plate-like material in advance, and the obtained value is made to be a thickness of a spacer to be inserted in the four corners upon setting the plate-like material on the processing machine;

4) The method of determining a machined surface [of a plate-like material] according to paragraph 3) above, wherein, when there is variation in the plate-like material thickness, the thickness of the spacer is corrected for the amount of the variation;

5) The method of determining a machined surface of a plate-like material according to any one of paragraphs 1) to 4) above, wherein the height of both the X direction and the Y direction of the coordinate axis of the plate-like material is measured at a position of a pitch which is 20 mm or less;

6) The method of determining a machined surface of a plate-like material according to any one of paragraphs 1) to 5) above, wherein the distance Z with the plate-like material is measured with a laser distance sensor or a contact distance sensor.

7) The method of determining a machined surface of a plate-like material according to any one of paragraphs 1) to 6) above, wherein, based on said data, inclination of a biaxial rotary-type machining table of an NC-controllable processing machine is adjusted in substitute for manually inserting a spacer at the four corners of the plate-like material;

8) A machining method of deciding a machined surface of a plate-like material with the method according to any one of paragraphs 1) to 7) above, and, based on the decided machined surface, performing machining such as cutting work, grinding, and electrical discharging to a plate-like material with two- or three-dimensional deformation to realize a uniform thickness;

9) A machining method of deciding a machined surface of a plate-like material with the method according to any one of paragraphs 1) to 7) above, and, based on the decided machined surface, surface grinding one surface of the plate-like material, and thereafter reversing and mounting the plate-like material on the surface plate to process the rear surface; and 10) A machining method of immovably fixing a plate-like material on the processing machine via adhesion or electromagnetic adsorption, deciding optimal inclination conditions through measurement with the method according to any one of paragraphs 1) to 7) above, thereafter using a biaxial inclination mechanism of the surface plate of the processing machine, without reversing the material, to incline the surface plate in parallel to a plane obtained with the optimal inclination conditions, and machining the material in this state.

The present invention further provides:

11) An apparatus of determining a machined surface of a plate-like material capable of minimizing machining costs upon machining the plate-like material with two- or three-dimensional deformation to realize a uniform thickness, comprising a system for mounting the plate-like material on a surface plate, setting a coordinate axis in a plane direction of the plate-like material to be X, Y and setting a coordinate axis in a vertical direction of the plate-like material to be Z, and virtually configuring with a computer a plane ABCD in which a distance in the vertical direction from the surface plate is H; a system for measuring a prescribed coordinate number while changing a distance (height) $Z_{00}$ from the plane ABCD in the coordinates (X, Y) of the plane ABCD to the coordinates (X, Y) of an upper surface of the plate-like material as an object to be measured while changing (X, Y), searching for a maximum value $Z_{00}$ (max) and a minimum value $Z_{00}$ (min) from all coordinate points to calculate a difference $D_{00}$ thereof; a system for subsequently fixing end A and end B or end A and end C of the plane ABCD and inclining the plane ABCD against the surface plate by sequentially raising and lowering either end C or end B in a prescribed height at a time within a prescribed range in the Z axis direction; a system for measuring the height from the plane ABCD to the upper surface of the plate-like material regarding all coordinate points (X, Y) on the plane ABCD as with the initial measurement when representing a new height Zmn by measuring a corresponding coordinate point of a material from the respective coordinates of the plane ABCD each time the inclination is changed one unit; and a system for repeating the search for the maximum value Zmn (max) and the minimum value Zmn (min) to calculate the difference $D_{mn}$ regarding all inclination conditions; wherein the inclination conditions of the plane ABCD having the smallest value of the obtained height difference $D_{00-mn}$ are made to be a parallel plane of a plane in which the plane ABCD (Dmin) will be of a minimum machining cost;

12) The apparatus for determining a machined surface of a plate-like material according to paragraph 11) above, wherein, upon reversing and mounting the plate-like material on the surface plate of the processing machine, a measurement point in which a height Z from the plane ABCD to the plate-like material is a smallest value in the determined minimum machined plane ABCD is searched, and the measurement point is set as a point that comes in contact with the surface plate;

13) The apparatus for determining a machined surface according to paragraph 11) or paragraph 12) above, wherein, upon reversing and mounting the plate-like material on the surface plate of the processing machine, the smallest value Zmin of the height Z from the plane ABCD to the plate-like material is subtracted from a height of the measurement point of four corners of the plate-like material in advance, and the obtained value is made to be a thickness of a spacer to be inserted in the four corners upon setting the plate-like material on the processing machine;

14) The apparatus for determining a machined surface according to paragraph 13) above, wherein, when there is variation in the plate-like material thickness, the thickness of the spacer is corrected for the amount of the variation;

15) The apparatus for determining a machined surface of a plate-like material according to any one of paragraphs 11) to 14) above, further comprising machining equipment for performing machining such as cutting work, grinding, and electrical discharging to a plate-like material with two- or three-dimensional deformation to realize a uniform thickness;

16) The apparatus for determining a machined surface of a plate-like material according to any one of paragraphs 11) to 15) above, further comprising an apparatus for surface grinding one surface of the plate-like material, and thereafter reversing and mounting the plate-like material on the surface plate to process the rear surface;

17) The apparatus for determining a machined surface of a plate-like material according to any one of paragraphs 11) to 16) above, further comprising an apparatus for measuring the height of both the X direction and the Y direction of the coordinate axis of the plate-like material at a position of a pitch which is 20 mm or less;

18) The apparatus for determining a machined surface of a plate-like material according to any one of paragraphs 11) to 17) above, further comprising an apparatus for measuring the distance Z with the plate-like material with a laser distance sensor or a contact distance sensor;

19) The apparatus for determining a machined surface according to paragraph 11) or paragraph 12) above, further comprising an apparatus for adjusting, based on said data, the inclination of a biaxial rotary-type machining table of an NC-controllable processing machine in substitute for manually inserting a spacer at the four corners of the plate-like material; and 20) A flattening device such as a surface grinding machine, a milling machine, or an electrical discharge machine comprising the apparatus according to any one of paragraphs 11) to 19) above.

The present invention yields a superior effect in that it is able to obtain a flat plate-like material having a uniform thickness from a plate-like material with complex two- or three-dimensional deformation by performing surface treatment to a product with machining such as cutting work, grinding, and electrical discharging with minimal machining cost.

In other words, specifically, when manufacturing a product with a predetermined thickness, it is possible to reduce the margin in the unprocessed thickness of the material, whereby the machining cost can be set lower than conventional methods, yield can be improved, and machining time can be shortened.

Further, when manufacturing a material without any designated thickness from a deformed material via machining, it is possible to thicken the thickness of products of conventional art.

In addition, no more trial and error will be required in setting a material on a processing machine table, and machining at a minimum machining cost can be easily performed even when the operator is not an expert.

As described above, the present invention yields significant effects.

DETAILED DESCRIPTION OF THE INVENTION

The present invention is now explained in detail with reference to the attached drawings as necessary. The following explanation, however, is merely for explaining the present invention in an easy-to-understand manner, and the invention is not limited to this explanation. In other words, any modifications, other structures or configurations based on the present invention are covered by the invention as a matter of course.

A plate-like material with complex two- or three-dimensional deformation such as a ceramic sintered plate or a metal plate prepared by metal rolling or forging is immovably placed on a surface plate having a certain degree of flatness.

For the sake of explanation, the coordinate axis in the plane direction of this material is set as X, Y and the coordinate axis in the height direction is set as Z. A measuring device such as a laser distance measuring device capable of retaining a certain degree of height from a surface plate and moving the surface plate in parallel to the XY direction is mounted on the surface plate. A plane parallel to a surface plate in which the Z axis origin of the sensor moves is set as plane P.

Figure 1:
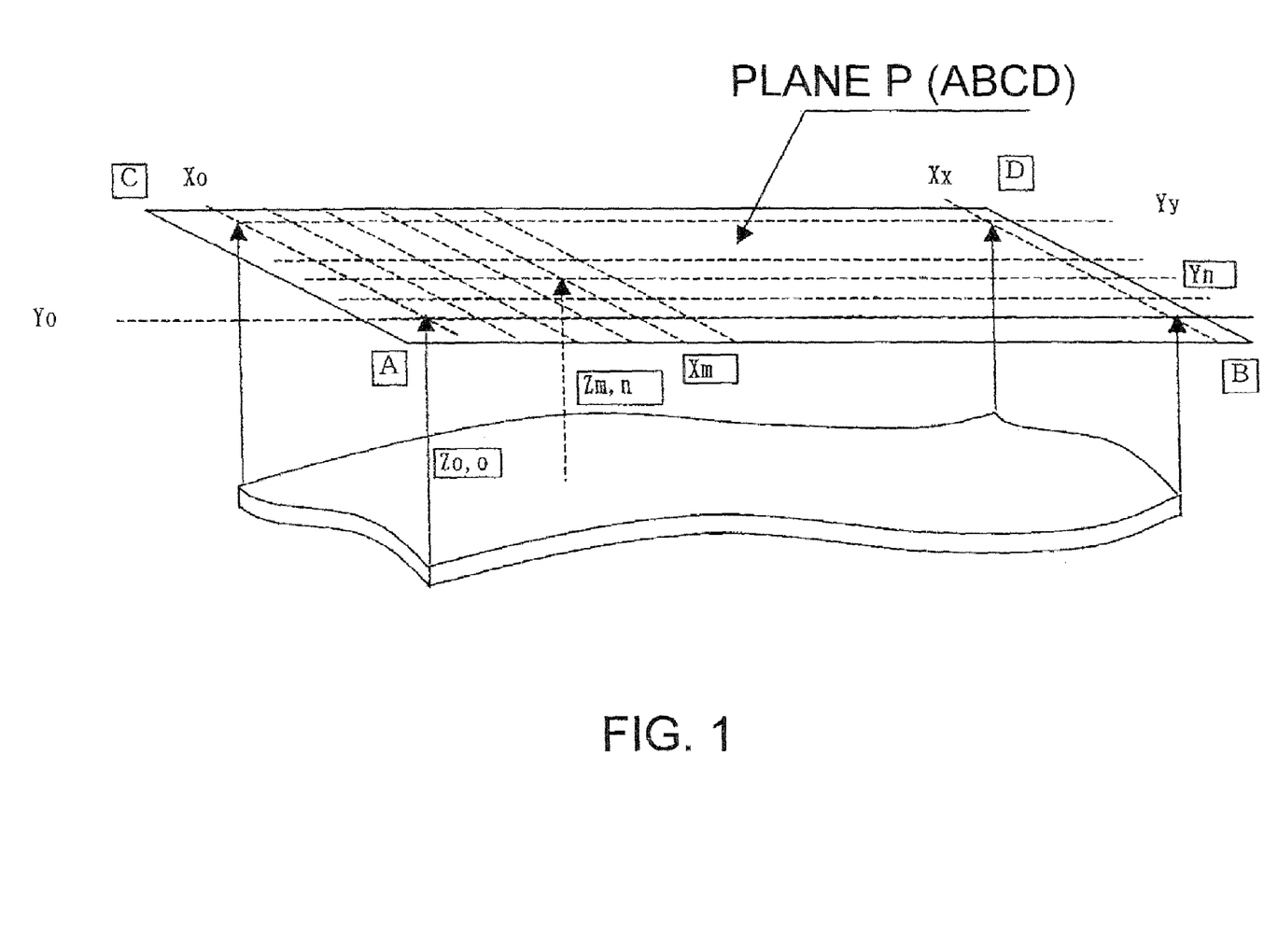
FIG. 1 is an explanatory diagram in a case of measuring the height (Zm, n) up to an arbitrary plane position (xm, yn) of a material S from the position of a sensor of a measuring device as the origin of the height direction.

As shown in FIG. 1, the height (Zm, n) from the sensor position of the measuring device that is made to be the origin of the height direction to an arbitrary plane position (Xm, Yn) of the material S are measured. It is necessary to change the X, Y coordinate points of measurement depending on the deformation of the product, and, for instance, the X direction and the Y direction are both made to be a pitch of 20 mm.

As the method for measuring the height, an appropriate method such as using a laser distance sensor or a contact distance sensor may be employed. Incidentally, height (Z coordinate) used herein refers to the distance of the perpendicular line from the coordinates (X, Y) of plane P on which the sensor of the measuring device moves to the point in reaching the material S surface.

The positioning accuracy of the X, Y coordinates and the measurement accuracy of the Z coordinate are determined based on the degree of demanding the reduction in machining costs of the material S. For example, with an expensive material such as a noble metal, it is effective to improve the measurement accuracy of the apparatus to seek the improvement in the yield upon cutting a product plate from the material. Nevertheless, the accuracy can be low when using an inexpensive material such as steel.

Further, when much machining time is required such as in machining ceramics, it is effective to improve the accuracy of the apparatus and reduce the machining cost and shorten the machining time. Nevertheless, the measurement accuracy can be low when using a metal material with favorable machinability in which the machining time will not be a problem.

According to the size of the material, all heights (Z0, 0 to Zx, y) from (X0, Y0) to (Xx, Yy: final coordinates) are measured. The result of all measurements can be temporarily stored in a recording device of a computer in a format such as a tabular form so data can be organized easily.

Foremost, the origin in the Z direction of the measuring device; that is, the plane S of the height H is virtualized. It can be said that the height of the respective measurement points is the height from the virtual surface.

The difference of the maximum value (Zmax) and the minimum value (Zmin) of the height data is the current machining cost. This is because, if the material S is set on the processing machine table in the current status, the cutting tool of the processing machine will start to come in contact from the minimum point (Zmin) of the height, and the material S will become flat when such cutting tool reaches the maximum point (Zmax) together with the advancement of machining. Therefore, in order to enable the machining of the material with minimal machining costs, the material S should be inclined so that the absolute value of the difference between the heights (Zmin) and (Zmax) becomes minimal.

Nevertheless, since a material is deformed to begin with, it is somewhat complicated to calculate changes in the height when inclining the material. Thus, instead of inclining the material S, the height can be recalculated by inclining the plane P.

Although there are numerous methods of inclining the plane P with a computer, the following method has been adopted since it is based on fact, calculation is easy, and the calculation result can be directly reflected on the thickness of a spacer. A plane (ABCD) on the plane P and of the same size as the material S is virtually configured in the computer. Here, the height (Zm, n) from the coordinates (Xm, Yn) in the plane ABCD to the coordinates (Xm, Yn) of the material is the initially measured height.

The height of the coordinates (m, n) of the plane ABCD is represented as (Zm, n)/0.0, 0.0. 0.0, 0.0 shows that the measured value has not been manipulated in any way; that is, it shows that the plane (ABCD) is not inclined.

The maximum value (Zm, n) 0.0, 0.0 max and the minimum value (Zm, n) 0.0, 0.0 min of Z (m, n) 0.0, 0.0 regarding all measured coordinate points are searched, and the difference H0.0, 0.0 is calculated with the following equation.

$$H0.0, 0.0 = (Zm, n)0.0, 0.0 \text{ max} - (Zm, n)0.0, 0.0 \text{ min}$$

Figure 2:
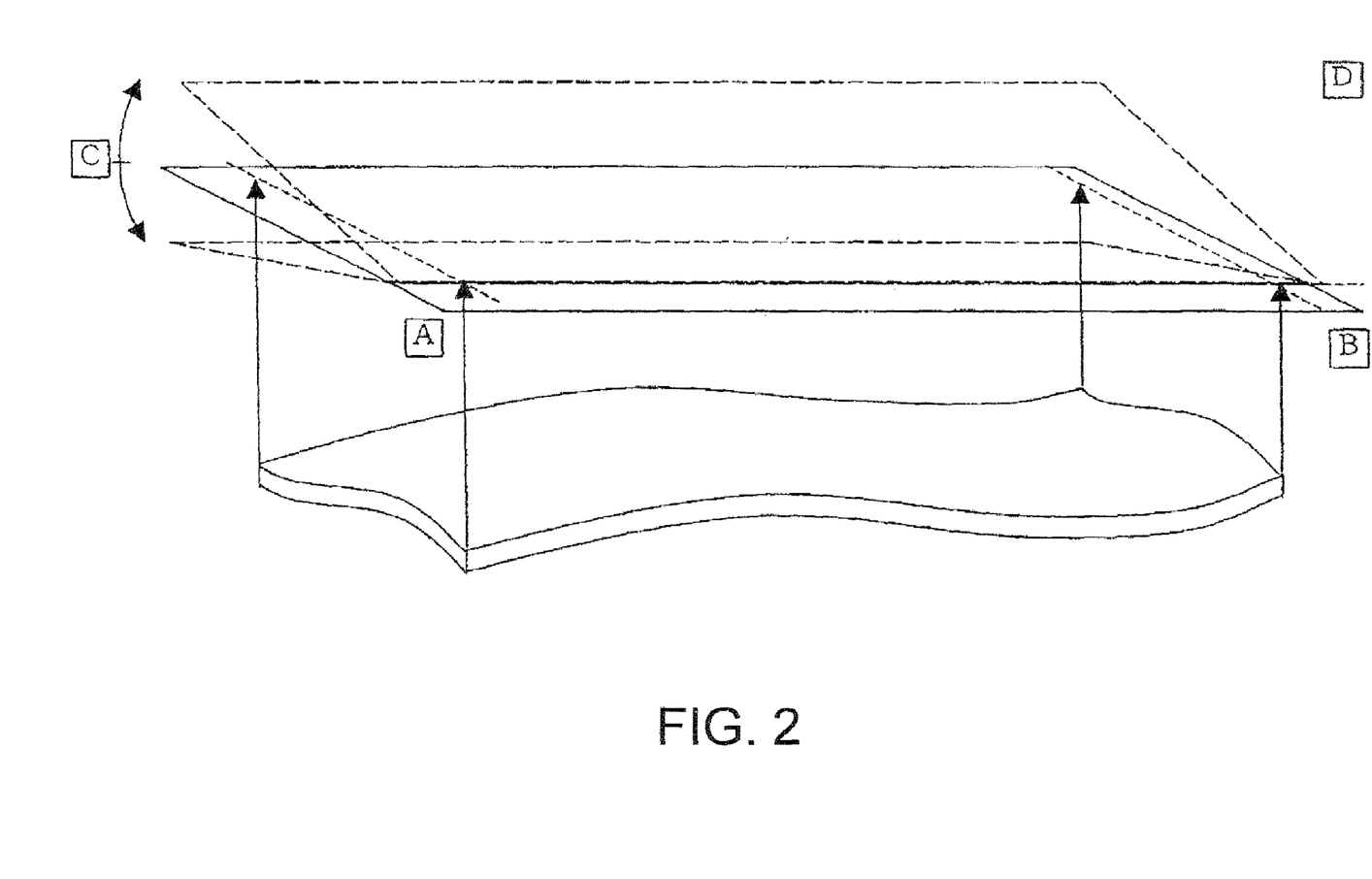
FIG. 2 is an explanatory diagram in a case of virtually configuring a plane (ABCD) that is the same size as the material S in a computer, fixing an end A of the plane ABCD, and moving only an end C to a prescribed height.
Figure 3:
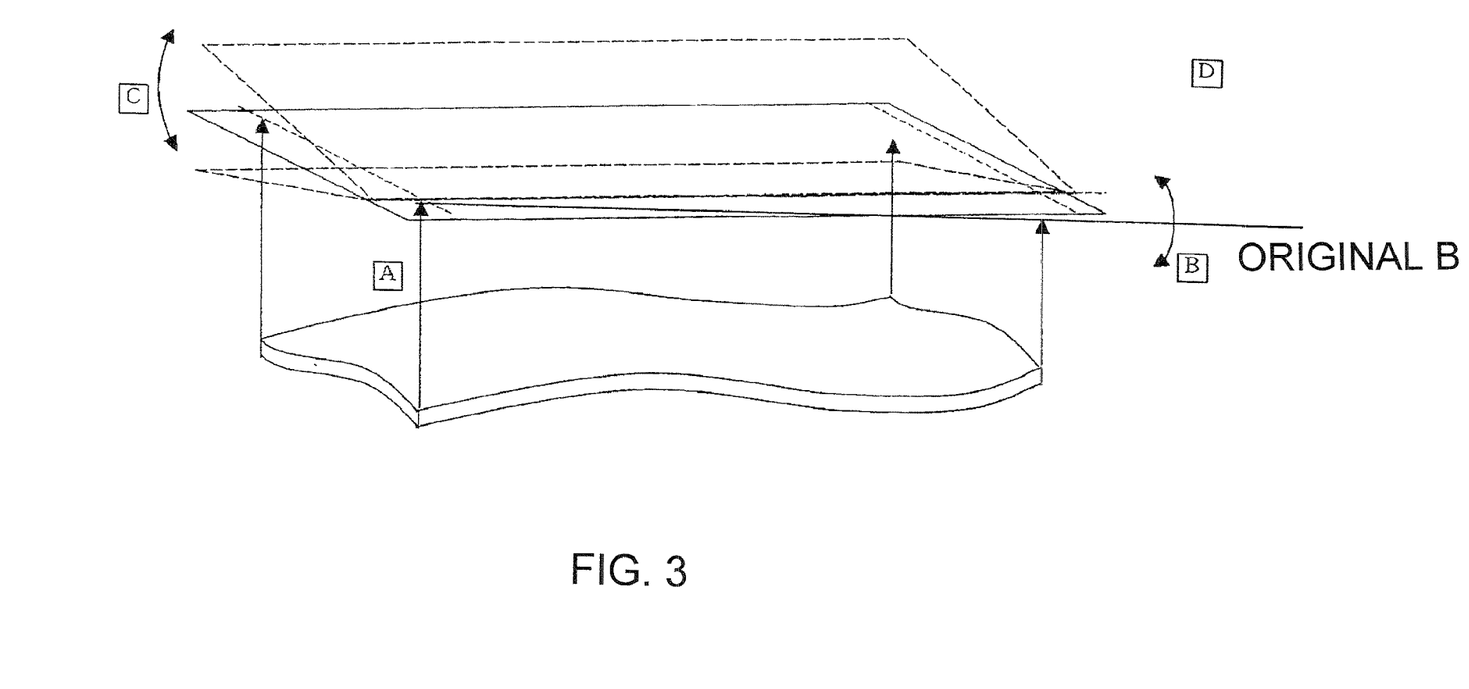
FIG. 3 is an explanatory diagram in a case of virtually configuring a plane (ABCD) that is the same size as the material S in a computer, fixing an end A of the plane ABCD, and moving ends B and C to a prescribed height.

Subsequently, as shown in FIG. 2 and FIG. 3, end A of the plane ABCD is fixed, and ends B, C are sequentially raised and lowered (for instance, ±3.0 mm) in a prescribed height (for example, 0.1 mm pitch) within a prescribed range in the Z axis direction. FIG. 2 illustrates a case of fixing end A of the plane ABCD and moving only end C to a prescribed height, and FIG. 3 depicts a case of fixing end A of the plane ABCD and moving ends B, C to a prescribed height.

End D is automatically decided when ABC are determined. For instance, foremost, when B is set to −3.0 mm and C is set to −3.0 mm, the distance from the respective coordinates of the plane ABCD to the corresponding coordinate point of the material is calculated, and the new height (Zm, n) is set to −3.0, −3.0. −3.0, −3.0 represents that point B is lowered 3.0 mm from the origin, and point C is lowered 3.0 mm from the origin.

This operation is performed to all measurement points, the maximum value (Zm, n) −3.0, −3.0 max and the minimum value (Zm, n) −3.0, −3.0 min of Z (m, n) −3.0, −3.0 are searched, and the difference H−3.0, −3.0 is calculated based on the following equation.

$$H(-3.0, -3.0) = (Zm, n)-3.0, -3.0 \text{ max} - (Zm, n)-3.0, -3.0 \text{ min}$$

Subsequently, C is set to −2.9 mm, and the same operation is repeated to seek H (−3.0, −2.9). Similarly, C is increased 0.1 mm at a time, and all corresponding heights H (−3.0, C) (C=−2.9, H−2.8, H−2.7 ... H 0 ... H+3.0) are sought.

After this operation is complete, B is set to −2.9, and the same operation is repeated while increasing C to −3.0 to +3.0 to seek all heights H (−2.9, C). Further, B is set to −2.8, −2.7, −2.6 ... 0 ... +3.0, and all corresponding heights H (B, C) are sought. In this example, there are 60 ways for B and 60 ways for C, so there are 60×60=3,600 ways for H (B, C).

Among such 3,600 ways, the H (B, C) showing the smallest value among the heights H; that is, the combination of H (B, C) min will be the plane that is parallel to the plane of the minimum machining cost for machining the material.

Incidentally, with the distance from the plane ABCD to the material surface, since the coordinates are out of alignment due to the inclination of the plane, it is necessary to correct such misalignment in the amount of the angle in order to ensure accuracy. Nevertheless, since the amount of inclination against the length of the material is small, this can be ignored in terms of execution.

Subsequently, among the measurement points of the H (B, C) min, the measurement point in which the height Z from the plane ABCD to the material is the smallest value; namely, Zmin/H (B, C) min, is searched. When actually engaging in machining, since the material is reversed upside down and set on the surface plate of the processing machine, this is the only point that comes in contact with the surface plate. However, when there are a plurality of points to become Zmin/H (B, C) min, all points will come in contact with the surface plate.

Subsequently, Zmin/H (B, C) min is subtracted from the height Z (X0, Y0), Z (Xx, Y0), Z (X0, Yy), Z (Xx, Yy) in the H (B, C) min of the measurement point of the four corners of the material. The value obtained thereby will become the thickness of a spacer to be inserted below the four corners upon setting the material on the processing machine.

In a practical sense, since the sensor is positioned at the upper part, the material is reversed upside down when being mounted on the processing machine. Thereupon, when the thickness of the material is different depending on the location, the height of the spacer determined with the foregoing method may not necessarily realize an optimal surface. However, when it is possible to ignore variations in the thickness of the material as in this example, it is not necessary to correct such variations.

When variations in the thickness of the material become a problem, the practical optimal surface can be easily determined by measuring the thickness of the four corners in advance, calculating the average value Ave. (X0Y0, XZY0, X0YZ, XZYZ), and adding or subtracting the difference between the average value and the thickness of the respective corners to or from the spacer height.

The material is reversed upside down from the time of measurement and fixed to the table of a plane processing machine such as a surface grinding machine or a front milling machine in a state with spacers laid under the prescribed four corners. If machining is performed in this state, it is possible to obtain a plane without any uncut portions with minimal machining cost.

Further, by providing to the processing machine an apparatus that is XY biaxially movable and capable of setting the inclination of the plane with such movement, and providing an inclination that realizes a surface where the optimal surface calculated with this apparatus is symmetrical to the Z axis direction in the XY plane, it is possible to realize an optimal surface without a spacer. However, in the foregoing case, it is desirable to insert a spacer for correcting the difference in heights at the four corners of the material when the plane ABCD is horizontal; that is, in the state of the initial measurement in order to prevent the material from moving.

The height of this spacer is equivalent to a value obtained by subtracting the height of a measurement point of a location with the lowest height from the height from the plane ABCD during the initial measurement to the measurement point of the four corners.

In addition to virtualizing the surface containing the original of the Z direction measured with a computer, the absolute value of the difference between the maximum value $Z_{max}$ and the minimum value $Z_{min}$ of the height data is sought.

The height of the virtual plane can be calculated based on the following equation. However, displacement in the X, Y direction as a result of inclining the sintered body can be ignored in view of the size of the work, and the Z coordinate axis of the grid point of the virtual plane can be sought with the following equation.

$$Z=Z1/(n-1)*i+Z2/(m-1)*j$$

Wherein n is the number of measurement points in the X direction, m is the number of measurement points in the Y direction, and i and j respectively show the measurement order from point 0.

As described above, inclination of the plate-like material can be adjusted by inclining the plate-like material in a computer and placing a spacer between the surface plate and the plate-like material based on the foregoing data. Further, this data can also be used to adjust the inclination of the biaxial rotary-type machining table of an NC-controllable processing machine.

Accordingly, it is possible to perform surface treatment such as cutting work, grinding, and electrical discharging to a plate-like material with complex two- or three-dimensional deformation to obtain a product with minimum machining cost. Further, after surface grinding one surface of the plate-like material as described above, the rear side can also be machined upon reversing and mounting the plate-like material on the surface plate.

The surface treatment method of a plate-like material according to the present invention yields a superior effect in that it is able to obtain a flat plate-like material having a uniform thickness from a plate-like material with complex two- or three-dimensional deformation by performing surface treatment to a product with machining such as cutting work, grinding, and electrical discharging with minimal machining cost.

In other words, specifically, when manufacturing a product with a predetermined thickness, it is possible to reduce the margin in the unprocessed thickness of the material, whereby the machining cost can be set lower than conventional methods, yield can be improved, and machining time can be shortened.

Further, when manufacturing a material without any designated thickness from a deformed material via machining, it is possible to thicken the thickness of products of conventional art.

In addition, no more trial and error will be required in setting a material on a processing machine table, and machining at a minimum machining cost can be easily performed even when the operator is not an expert.

As described above, since the present invention is able to obtain a flat plate-like material having a uniform thickness by performing surface treatment with machining such as cutting work, grinding, and electrical discharging with minimal machining cost, it is suitable for the manufacture of a relatively expensive sputtering target or the like.

The invention claimed is:

1. A method of determining a machined surface of a plate-like material capable of minimizing machining margin upon machining the plate-like material with two- or three-dimensional deformation to realize a uniform thickness, comprising the steps of:

setting a surface plate surface of a measuring device as coordinates (X,Y), setting orthogonal coordinates (X,Y,Z) formed from a Z coordinate that is perpendicular to the coordinates (X,Y) on the surface plate, mounting the plate-like material as an object to be measured on the surface plate, and virtually configuring with a computer a plane ABCD that is parallel to the XY plane in which a distance from the surface plate is H, measuring a distance (height) Zm,n from coordinates (Xm, Yn) of the virtual plane ABCD to coordinates (Xm, Yn) of an upper surface of the plate-like material as an object to be measured m times in the X direction and n times in the Y direction while changing the coordinates (X,Y) for all areas of the plate-like material, and storing the measured data in a storage apparatus of the computer;

searching for a maximum value and a minimum value of Zm,n regarding all coordinate points and calculating the difference thereof, and setting the value as H 0.0, 0.0 when no inclination operation is performed on the virtual plane ABCD;

subsequently regarding a maximum fluctuation width and pitch predetermined in the Z axis direction, inclining the virtual plane ABCD against the surface plate by fixing end A of the virtual plane ABCD and respectively raising and lowering end C and end B at prescribed fluctuation widths B, C;

calculating a distance (height) (Zm,n) B, C from all coordinate points (Xm,Yn) on the virtual plane ABCD to the corresponding coordinate point of the upper surface of the plate-like material each time the inclination is changed, and searching for the maximum value and the minimum value of (Zm,n) B, C and calculating the different H (B,C) thereof; and repeating the search for all combinations of B and C set in advance, and deciding the smallest value of H(B,C) calculated with all combinations of B and C as a parallel plane of a plane in which the virtual plane ABCD will be of a minimum machining margin.

2. The method of determining a machined surface of a plate-like material according to claim 1, wherein, upon reversing and mounting the plate-like material on the surface plate of a machining machine, a measurement point in which a height Z from the virtual plane ABCD to the plate-like material is a smallest value in the virtual plane ABCD with the minimum machining margin determined is searched, and the measurement point is set as a point that comes in contact with the surface plate.

3. The method of determining a machined surface of a plate-like material according to claim 1, wherein, upon reversing and mounting the plate-like material on the surface plate of a machining machine, the smallest value Zmin of the height Z from the virtual plane ABCD to the plate-like material is subtracted from a height of the measurement point of four corners of the plate-like material in advance, and the obtained value is made to be a thickness of a spacer to be inserted in the four corners upon setting the plate-like material on the machining machine.

4. The method of determining a machined surface of a plate-like material according to claim 3, wherein, when there is variation in the plate-like material thickness, the thickness of the spacer is corrected for the amount of the variation.

5. The method of determining a machined surface of a plate-like material according to claim 1, wherein the height of both the X direction and the Y direction of the coordinate axis of the plate-like material is measured at a position of a pitch which is 20 mm or less.

6. The method of determining a machined surface of a plate-like material according to claim 1, wherein the distance Z with the plate-like material is measured with a laser distance sensor or a contact distance sensor.

7. The method of determining a machined surface of a plate-like material according to claim 1, wherein, based on said data, inclination of a biaxial rotary-type machining table of an NC-controllable machining machine is adjusted in substitute for manually inserting a spacer at the four corners of the plate-like material.

8. A machining method of deciding a machined surface of a plate-like material with the method according to claim 1, and, based on the decided machined surface, performing machining such as cutting work, grinding, and electrical discharging to a plate-like material with two- or three-dimensional deformation to realize a uniform thickness.

9. A machining method of deciding a machined surface of a plate-like material with the method according to claim 1, and, based on the decided machined surface, surface grinding one surface of the plate-like material, and thereafter reversing and mounting the plate-like material on the surface plate to process the rear surface.

10. A machining method of immovably fixing a plate-like material on a machining machine via adhesion or electromagnetic adsorption, deciding optimal inclination conditions through measurement with the method according to claim 1, thereafter using a biaxial inclination mechanism of the surface plate of the machining machine, without reversing the material, to incline the surface plate in parallel to a plane obtained with the optimal inclination conditions, and machining the material in this state.

11. An apparatus for determining a machined surface of a plate-like material capable of minimizing machining margin upon machining the plate-like material with two- or three-dimensional deformation to realize a uniform thickness, comprising:

a surface plate on which the plate-like material is supported as an object to be measured, a distance sensor retained a height from said surface plate, and a computer receiving data measured by said distance sensor and having a recording device;

said surface plate having a surface defining coordinates (X,Y) used to define orthogonal coordinates (X,Y,Z) formed from a Z coordinate that is perpendicular to the coordinates (X,Y) on the surface plate, and said computer having software stored on a computer storage medium for virtually configuring a plane ABCD that is parallel to the XY plane in which a distance from the surface plate is H;

said distance sensor being arranged to measure a distance (height) $Z_{m,n}$ from coordinates $(X_m, Y_n)$ of the virtual plane ABCD to coordinates $(X_m, Y_n)$ of an upper surface of the plate-like material as an object to be measured m times in the X direction and n times in the Y direction while changing the coordinates (X, Y) for all areas of the plate-like material, and the measured data being stored in said recording device of the computer;

said software for searching for a maximum value and a minimum value of $Z_{m,n}$ regarding all coordinate points and calculating the difference thereof and setting the value as difference H 0.0, 0.0 when no inclination operation is performed on the virtual plane ABCD;

subsequently regarding a maximum fluctuation width and pitch predetermined in the Z axis direction, said software for inclining the virtual plane ABCD against the surface plate by fixing end A of the virtual plane ABCD and respectively raising and lowering end C and end B at prescribed fluctuation widths B, C;

said software for calculating a distance (height) $(Z_{m,n})$ B, C from all coordinate points $(X_m, Y_n)$ on the virtual plane ABCD to the corresponding coordinate point of the upper surface of the plate-like material each time the inclination is changed, searching for the maximum value and the minimum value of $(Z_{m,n})$ B, C and calculating the difference H (B,C) thereof and repeating the search for all combinations of B and C in advance;

wherein the smallest value of H(B,C) is determined to be a parallel plane of a plane in which the virtual plane ABCD will be of a minimum machining margin.

12. The apparatus for determining a machined surface of a plate-like material according to claim 11, wherein, upon reversing and mounting the plate-like material on the surface plate of a machining machine, a measurement point in which a height Z from the virtual plane ABCD to the plate-like material is a smallest value in the virtual plane ABCD with the minimum machining margin is searched, and the measurement point is set as a point that comes in contact with the surface plate.

13. Apparatus according to claim 11, wherein, upon reversing and mounting the plate-like material on the surface plate of a machining machine, the smallest value Zmin of the height Z from the virtual plane ABCD to the plate-like material is subtracted from a height of the measurement point of four corners of the plate-like material in advance, and the obtained value is made to be a thickness of a spacer to be inserted in the four corners upon setting the plate-like material on the machining machine.

14. Apparatus according to claim 13, wherein, when there is variation in the plate-like material thickness, the thickness of the spacer is corrected for the amount of the variation.

15. Apparatus according to claim 11, further comprising machining equipment for performing machining such as cutting work, grinding, and electrical discharging to a plate-like material with two- or three-dimensional deformation to realize a uniform thickness.

16. Apparatus according to claim 11, further comprising an apparatus for surface grinding one surface of the plate-like material, and thereafter reversing and mounting the plate-like material on the surface plate to process the rear surface.

17. Apparatus according to claim 11, further comprising an apparatus for measuring the height of both the X direction and the Y direction of the coordinate axis of the plate-like material at a position of a pitch which is 20 mm or less.

18. Apparatus according to claim 11, wherein said distance sensor is a laser distance sensor or a contact distance sensor.

19. Apparatus according to claim 11, further comprising an apparatus for adjusting, based on said data, the inclination of a biaxial rotary-type machining table of an NC-controllable machining machine in substitute for manually inserting a spacer at the four corners of the plate-like material.

20. A flattening device comprising one of a surface grinding machine, a milling machine, or an electrical discharge machine comprising the apparatus according to claim 11.

* * * * *